US011354879B1

(12) United States Patent
Yao et al.

(10) Patent No.: US 11,354,879 B1
(45) Date of Patent: *Jun. 7, 2022

(54) SHAPE-BASED EDGE DETECTION

(71) Applicant: Amazon Technologies, Inc., Seattle, WA (US)

(72) Inventors: Ning Yao, San Jose, CA (US); Qiang Liu, Cupertino, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/733,724

(22) Filed: Jan. 3, 2020

Related U.S. Application Data

(63) Continuation of application No. 13/537,424, filed on Jun. 29, 2012, now Pat. No. 10,528,853.

(51) Int. Cl.

| | |
|---|---|
| ***G06V 10/10*** | (2022.01) |
| ***G06V 10/75*** | (2022.01) |
| ***H04N 9/31*** | (2006.01) |
| ***G03B 21/00*** | (2006.01) |

(52) U.S. Cl.

CPC .............. *G06V 10/10* (2022.01); *G06V 10/75* (2022.01); *G06V 10/752* (2022.01); *G06V 10/757* (2022.01); *G03B 21/00* (2013.01); *H04N 9/31* (2013.01)

(58) Field of Classification Search

None

See application file for complete search history.

(56) References Cited

U.S. PATENT DOCUMENTS

| | | | | |
|---|---|---|---|---|
| 5,809,171 | A * | 9/1998 | Neff | G06K 9/00973 382/103 |
| 6,151,403 | A | 11/2000 | Luo | |
| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 8,190,278 | B2 | 5/2012 | Kneissler | |
| 8,840,250 | B1 | 9/2014 | Yao et al. | |
| 10,528,853 | B1 * | 1/2020 | Yao | G06K 9/6211 |
| 2004/0036813 | A1 | 2/2004 | Matsuda | |
| 2006/0043264 | A1 | 3/2006 | Sakurai | |
| 2006/0098877 | A1 | 5/2006 | Barnes et al. | |
| 2007/0122039 | A1 | 5/2007 | Zhang et al. | |
| 2007/0247422 | A1 | 10/2007 | Vertegaal et al. | |

(Continued)

FOREIGN PATENT DOCUMENTS

| | | |
|---|---|---|
| NO | WO2011088053 | 7/2011 |

OTHER PUBLICATIONS

Cao, et al., "Interacting with Dynamically Defined Information Spaces Using a Handheld Projector and a Pen", UIST'Oct. 15-18, 2006, Montreux, Switzerland, ACM, 2006, pp. 225-234.

(Continued)

*Primary Examiner* — Lindsay J Uhl

(74) *Attorney, Agent, or Firm* — Lee & Hayes, P.C.

(57) ABSTRACT

Techniques are described for detecting a periphery of a surface based on a point set representing the surface. The surface may correspond to a display medium upon which content is projected. A shape model may be matched and aligned to a contour of the point set. A periphery or edge of the surface and corresponding display medium may be determined based on the aligned shape model.

20 Claims, 5 Drawing Sheets

(56) References Cited

U.S. PATENT DOCUMENTS

| | | | | |
|---|---|---|---|---|
| 2008/0144942 | A1 | 6/2008 | Besley et al. | |
| 2009/0022365 | A1 | 1/2009 | Kotake | |
| 2010/0022220 | A1* | 1/2010 | Gupta | H04W 4/12 455/412.2 |
| 2010/0199232 | A1* | 8/2010 | Mistry | G06F 3/0425 715/863 |
| 2011/0154233 | A1 | 6/2011 | Lamarca et al. | |
| 2011/0234879 | A1 | 9/2011 | Kashitani | |
| 2012/0223885 | A1 | 9/2012 | Perez | |
| 2012/0249416 | A1* | 10/2012 | Maciocci | G06T 17/05 345/156 |
| 2013/0044193 | A1 | 2/2013 | Kulkarni | |
| 2013/0106692 | A1 | 5/2013 | Maizels et al. | |
| 2013/0113913 | A1* | 5/2013 | Scheid | G06T 3/4038 348/82 |
| 2013/0127847 | A1 | 5/2013 | Jin et al. | |
| 2013/0229396 | A1 | 9/2013 | Huebner | |
| 2013/0271577 | A1* | 10/2013 | Watanabe | H04N 13/275 348/46 |

OTHER PUBLICATIONS

Edelsbrunner, et al., "On the Shape of a Set of Points in the Plane", IEEE Transactions on Information Theory, vol. 29, No. 4, Jul. 1983, pp. 551-559.

Jacobs, "Correlation and Convolution", Class Notes for CMSC 426 (Fall 2005), Retrieved from <<http://www.cs.umd.edu/~djacobs/CMSC426/Convolution.pdf>>, Fall 2005, 17 pages.

Klasing, et al., "Comparison of Surface Normal Estimation Methods for Range Sensing Applications", Proceeding ICRA'09 Proceedings of the 2009 IEEE international conference on Robotics and Automation, 2009, 6 pgs.

Office Action for U.S. Appl. No. 13/486,634, dated Jan. 7, 2015, Qiang Liu, "Edge-Based Pose Detection", 18 pages.

Office Action for U.S. Appl. No. 13/537,424, dated Jan. 8, 2015, "Shape-Based Edge Detection", Ning Yao, 31 pages.

Office Action for U.S. Appl. No. 13/486,634, dated Jan. 17, 2014, Qiang Liu, "Edge-Based Pose Detection", 18 pages.

Office Action for U.S. Appl. No. 13/486,664, dated Jan. 30, 2014, Samuel Henry Chang, "Pose Tracking", 17 pages.

Office action for U.S. Appl. No. 13/486,634 dated Nov. 20, 2015, Liu et al., "Edge-Based Pose Detection", 18 pages.

Office Action for U.S. Appl. No. 13/537,424, dated Feb. 8, 2017, "Shape-Based Edge Detection", Ning Yao, 29 pages.

Office action for U.S. Appl. No. 13/486,634, dated Apr. 6, 2016, Liu et al., "Edge-Based Pose Detection", 19 pages.

Office action for U.S. Appl. No. 13/537,424, dated May 18, 2016, Yao et al., "Shape-Based Edge Detection", 27 pages.

Final Office Action for U.S. Appl. No. 13/486,634, dated Jun. 5, 2014, Qiang Liu, "Edge-Based Pose Detection", 19 pages.

Final Office Action for U.S. Appl. No. 13/486,634, dated Jun. 9, 2015, Qiang Liu, "Edge-Based Pose Detection", 19 pages.

Office action for U.S. Appl. No. 13/537,424, dated Jul. 30, 2015, Yao et al., "Shape-Based Edge Detections", 32 pages.

Olsen, et al. "Multi-Scale Gradient Magnitude Watershed Segmentation", 9th International Conference, ICIAP 97, Florence, Italy, 1997, 8 pages.

Pinhanez, "The Everywhere Displays Projector: A Device to Create Ubiquitous Graphical Interfaces", IBM Thomas Watson Research Center, Ubicomp 2001, 18 pages.

Summet, et al., "Tracking Locations of Moving Hand-Held Displays Using Projected Light", Pervasive 2005, LNCS 3468, Springer-Verlag Berlin Heidelberg, 2005, pp. 37-46.

Zhang, et al., "Visual Panel: Virtual Mouse, Keyboard and 3D Controller with an Ordinary Piece of Paper", PUI 2001, Orlando, FL, USA, ACM, 2001, pp. 1-8.

* cited by examiner

SHAPE-BASED EDGE DETECTION

CROSS-REFERENCE TO RELATED APPLICATION

This application is a continuation of and claims priority to U.S. patent application Ser. No. 13/537,424, filed on Jun. 29, 2012, entitled "Shape-Based Edge Detection", which is incorporated herein in its entirety by reference.

BACKGROUND

A large and growing population of people is enjoying entertainment through consumption of digital content items, such as music, movies, images, books, and so on. Many people today consume digital content through a wide variety of electronic devices. Among these electronic devices are cellular telephones, personal digital assistants (PDAs), electronic book readers, portable media players, tablets, netbooks, and the like. As more content is made available in digital form, people continue to consume more and more of this content. In addition, this population expects digital content to become more and more accessible and ubiquitous.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
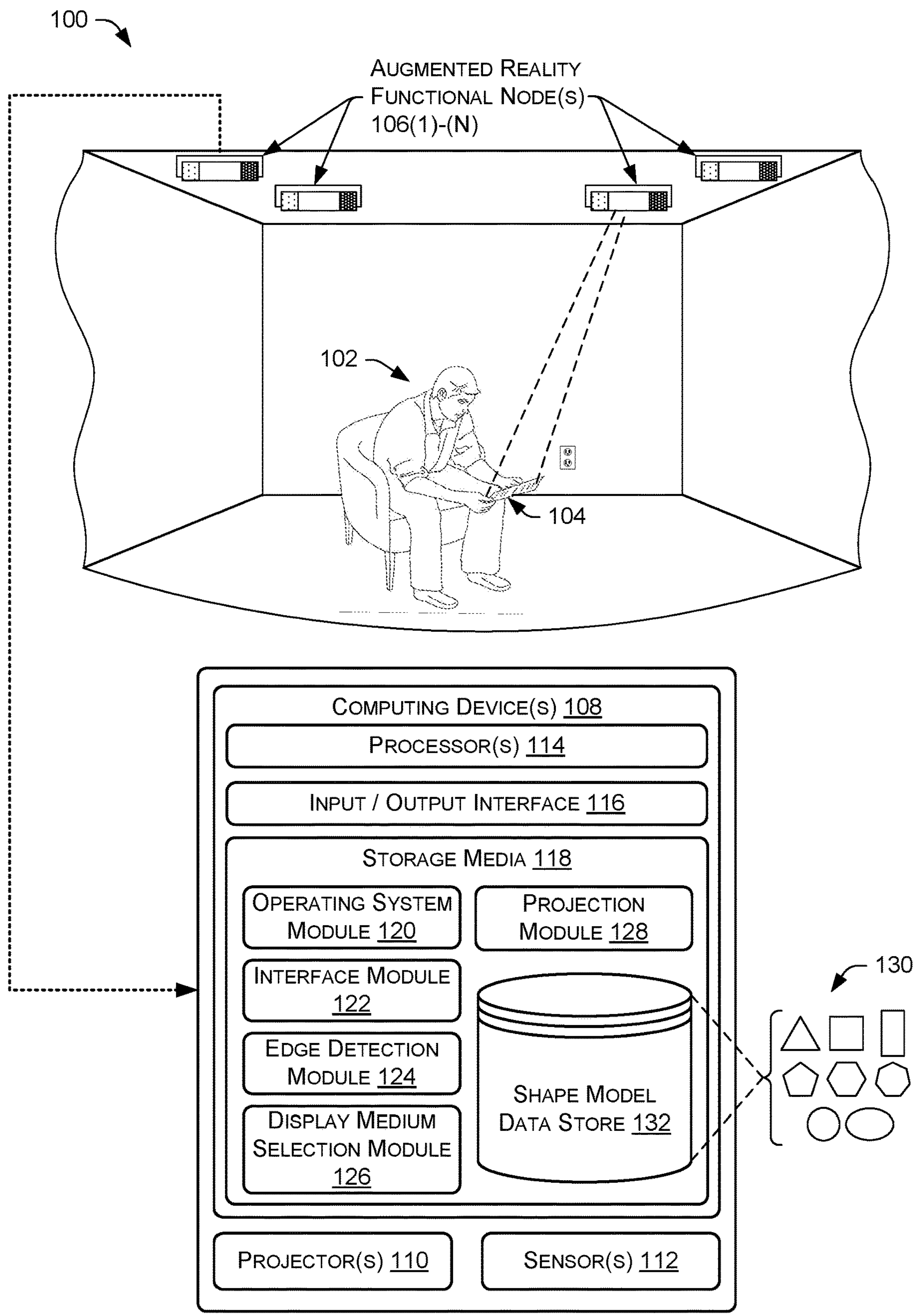
FIG. 1 illustrates an example environment that includes an augmented reality functional node (ARFN) configured to detect a periphery of a display medium.

This disclosure describes architectures and techniques for detecting a periphery of a display medium. In certain embodiments, the display medium may be a polygonal or circular object, such as a blank card or sheet of paper, onto which content is projected. A user may hold the display medium and move the display medium in different ways through a room or other environment. This may allow the user to read an electronic book, watch a video, view images, or otherwise consume any other form of projected content on the display medium. To accurately project an image onto the display medium, the periphery of the display medium may be detected. For example, a shape, size, and/or three-dimensional (3D) pose (e.g., position and orientation) of the display medium may be detected.

To detect the periphery of the display medium, a 3D image, point set, or depth map of scene containing the display medium may be obtained and segmented to produce 3D point sets or point clouds corresponding to different surfaces within the scene. The different surfaces and their 3D point sets may then be evaluated to determine which of the surfaces most likely represents the display medium.

After identifying the 3D point set representing the surface of the display medium, the point set may be analyzed to determine the periphery of the display medium. The 3D point set of the surface may be processed to identify a 3D image contour, also referred to herein as a data contour or observed contour, which comprises those 3D points of the point set that are at the periphery or outer boundary of the display medium. The 3D image contour may be compared to shape models to identify a shape model that most closely represents the 3D image contour. The shape models may include, for example, a triangle, rectangle, square, pentagon, hexagon, or other polygon. Alternatively, or additionally, the shape models may include a circular shape, such as an ellipse or circle. The identified shape model may then be aligned to the observed contour by, for example, adjusting a length of a side of the shape model, determining a pose (e.g., position and orientation) of the shape model, and so on. The periphery of the display medium may then be determined based on the aligned shape model. That is, a shape, size, and/or pose of the display medium may be detected.

In some instances, the techniques described herein may provide accurate information about a periphery of a display medium. For example, the information may indicate a shape, size, and/or pose of the periphery of the display medium which may be more accurate than a set of 3D points obtained from a 3D image, point set, or depth map. This information may allow content to be accurately projected onto a display medium. For example, the information may allow content be aimed, scaled, rotated, and so forth to occupy a surface of the display medium.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Environment

FIG. 1 illustrates an example environment 100 in which a user 102 consumes content that is projected onto a display medium 104 by one or more augmented reality functional nodes (ARFNs) 106(1), . . . , 106(N) (collectively referred to as "the ARFN 106" in some instances). It is to be appreciated that the techniques described herein may be performed by a single ARFN, by a collection of any number of ARFNs, or by any other devices or combinations of devices. The projected content may include electronic books, videos, images, interactive menus, or any other sort of visual and/or audible content.

The display medium 104 may generally comprise a passive and/or non-powered medium onto which content is projected. In some instances, the display medium 104 comprises a movable and/or handheld object, such as a piece of paper, furniture, or poster board. Further, in some instances the display medium 104 comprises an object that may not be easily movable in the environment 100, such as a wall, ceiling, floor, etc.

As illustrated, the ARFN node 106 comprises a computing device(s) 108, a projector(s) 110, and a sensor(s) 112 (e.g., camera, ranging system, etc.). Some or the all of the computing device(s) 108 may reside within a housing of the ARFN node 106 or may reside at another location that is operatively connected to the ARFN node 106. The computing device(s) 108 comprises a processor(s) 114, an input/output interface 116, and storage media 118. The processor(s) 114 may be configured to execute instructions that may be stored in the storage media 118 or in other storage media accessible to the processor(s) 114.

The input/output interface 116, meanwhile, may be configured to couple the computing device(s) 108 to other components of the ARFN node 106, such as the projector(s) 110, the sensor(s) 112, other ARFN nodes (such as in other environments or in the environment 100), other computing devices, network communication devices (such as modems, routers, and wireless transmitters), and so forth. The coupling between the computing device(s) 108 and other devices may be via wire, fiber optic cable, wireless connection, or the like. The sensor(s) 112 may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, and pressure sensors. Other sensor types may be utilized without departing from the scope of the present disclosure.

The storage media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory, or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device(s) 108. The storage media 118 may reside within a housing of the ARFN 106, on one or more storage devices accessible on a local network, on cloud storage accessible via a wide area network, or in any other accessible location. As defined herein, CRSM does not include communication media, such as modulated data signals and carrier waves.

The storage media 118 may store several modules, such as instructions, data stores, and so forth that are configured to execute on the processor(s) 114. For instance, the storage media 118 may store an operating system module 120, an interface module 122, an edge detection module 124, a display medium selection module 126, and a projection module 128. The storage media 118 may also include other modules, which may be configured to implement various different functionality of the ARFN 106.

The operating system module 120 may be configured to manage hardware and services within and coupled to the computing device(s) 108 for the benefit of other modules. The interface module 122, meanwhile, may be configured to receive and interpret commands received from users within the environment 100. For instance, the interface module 122 may analyze and parse images captured by one or more cameras of the sensor(s) 112 to identify users within the environment 100 and to identify gestures made by users within the environment 100, such as gesture commands to project display content. In other instances, the interface module 122 identifies commands audibly issued by users within the environment and captured by one or more microphones of the sensor(s) 112. In still other instances, the interface module 122 allows users to interface and interact with the ARFN node 106 in any way, such as via physical controls, and the like.

The edge detection module 124 may detect a periphery of the display medium 104. The detection may include analyzing an observed contour representing the display medium 104 to determine a shape, size, and/or 3D pose of the observed contour and corresponding display medium 104. For example, the detection may include comparing shape models 130 to the observed contour to determine a general shape of the observed contour, and corresponding display medium 104. A shape model may be identified based on the comparing and the shape model may be aligned (e.g., repositioned, transformed, etc.) to the observed contour. The aligned shape model may represent the periphery of the display medium 104.

The aligned shape model may provide information about a shape, size, and/or 3D pose (e.g., position, orientation, etc.) of the periphery of the display medium 104. This information may be more accurate than a set of 3D points obtained from a 3D image, point set, or depth map. The information may indicate, for example, that the display medium 104 has a particular number of sides (e.g., 3-sided, 4-sided, etc.), is a particular shape (e.g., a triangle, rectangle, circle, etc.), has particular dimensions, and so on. In some instances, the information indicates a pose of the display medium 104. The pose may indicate a position specified by linear measurements with respect to orthogonal 3D axes, such as X, Y, and Z, and/or may indicate an orientation specified by angular measurements around the 3D axes, such as by angles $\theta_X$, $\theta_Y$, and $\theta_Z$. Accordingly, in some instances the pose may be indicated or specified by a vector $[X, Y, Z, \theta_X, \theta_Y, \theta_Z]$.

The display medium selection module 126 may select a display medium within the environment 100 to project content onto. In some instances, the environment 100 may include a plurality of potential display media onto which content may be projected, such as different surfaces within the environment 100. As such, the display medium selection module 126 may select a particular display medium from among the plurality of potential display media. For example, the display medium selection module 126 may rank potential display media, provide a ranked list to a user, and/or receive a selection from the user regarding a desired display medium. The selected display medium may be used by, for example, the projection module 128 to project content.

The projection module 128 may receive the information about the periphery of the display medium and may manipulate the projected content so that it appears correctly on the display medium 104. For example, the projection module 128 may vary the size, location, orientation, and/or aspect ratio of the projected image. The projection module 128 may also use techniques such as keystone correction to correct the appearance of the projected image in situations where the projection source is not aligned with the display medium. For example, the projected image may be intentionally distorted to account for a non-perpendicular alignment of the display medium with respect to the projection source. In some situations, the projected image may also be distorted to correct for irregularities or non-planar characteristics of the display medium 104.

The storage media 118 may also include a shape model data store 132 configured to store the shape models 130. The shape models 130 may include data substantially describing a triangle, quadrilateral (e.g., rectangle, square, trapezoid, etc), pentagon, hexagon, septagon, or other polygon. Alternatively, or additionally, the shape models 130 may include data describing a circular shape, such as an ellipse or circle, or a specialized shape model associated with a particular object or entity on which content is projected. In some cases, the shape models 130 correspond to display mediums that were determined to be associated with one or more users. For example, a particular shape model may be stored in association to a user based on a user's previous use of a display medium corresponding to the shape model, user input specifying a display medium used, and so on.

Example ARFN

Figure 2:
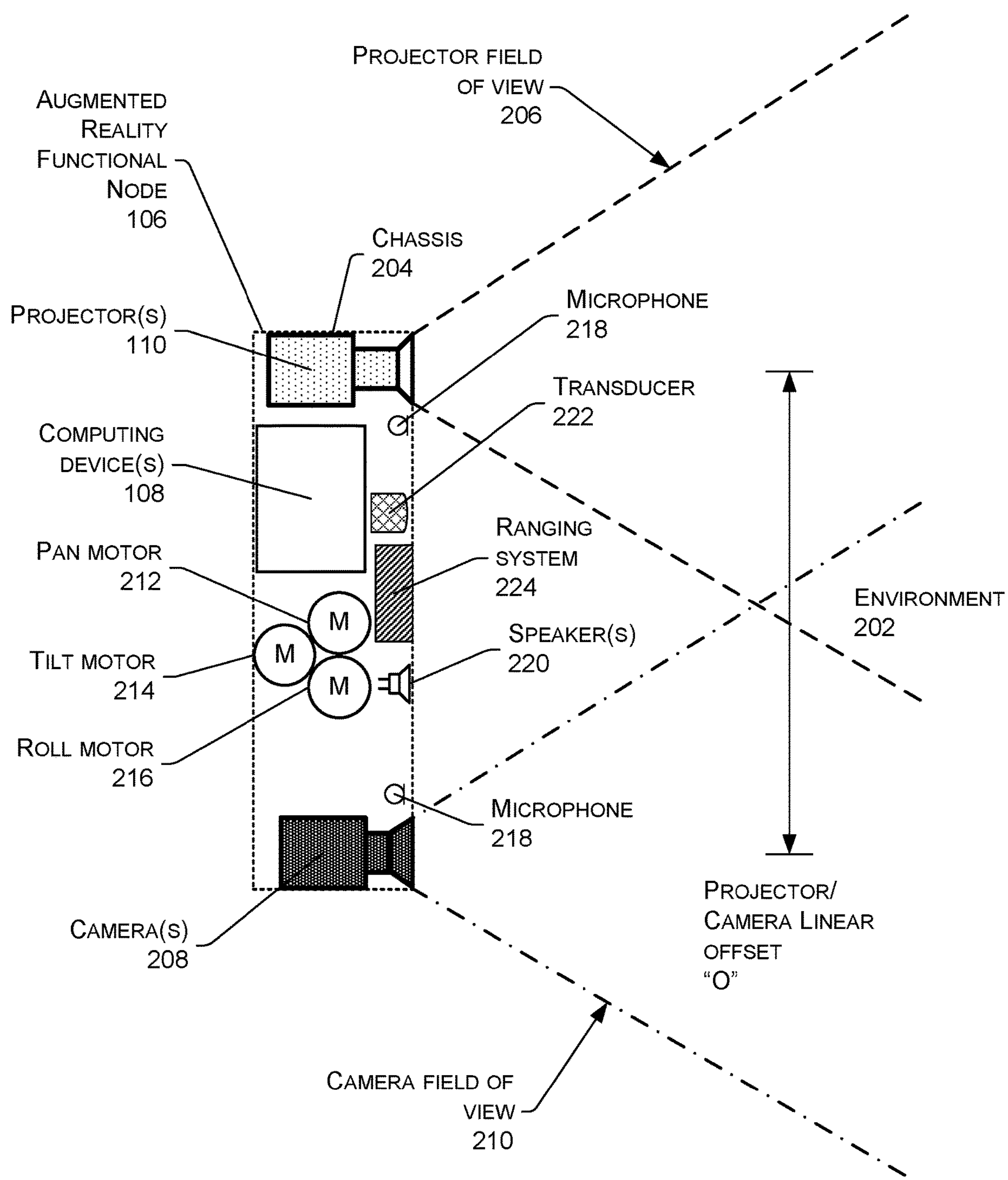
FIG. 2 shows additional details of the example ARFN of FIG. 1.

FIG. 2 shows additional details of an example ARFN that may be configured to detect a periphery of a display medium. The ARFN node 106 is configured to scan at least a portion of an environment 202 and the objects therein to detect and identify a display medium. The ARFN node 106 may also be configured to provide augmented reality output, such as images, sounds, and so forth.

A chassis 204 holds the components of the ARFN node 106. The projector(s) 110 may be disposed within the chassis 204 and may be configured to generate and project light and/or images into the environment 202. These images may be visible light images perceptible to a user, visible light images imperceptible to the user, images with non-visible light, or a combination thereof. This projector(s) 110 may be implemented with any number of technologies capable of generating an image and projecting that image onto a surface within the environment 202. Suitable technologies include a digital micromirror device (DMD), liquid crystal on silicon display (LCOS), liquid crystal display, 3LCD, and so forth. The projector(s) 110 has a projector field of view 206 which describes a particular solid angle. The projector field of view 206 may vary according to changes in the configuration of the projector(s) 110. For example, the projector field of view 206 may narrow upon application of an optical zoom to the projector(s) 110.

A camera(s) 208 may also be disposed within the chassis 204. The camera(s) 208 is configured to image the environment 202 in visible light wavelengths, non-visible light wavelengths, or both. The camera(s) 208 has a camera field of view 210 that describes a particular solid angle. The camera field of view 210 may vary according to changes in the configuration of the camera(s) 208. For example, an optical zoom of the camera(s) 210 may narrow the camera field of view 210.

In some implementations, a plurality of cameras 208 may be used. For instance, one embodiment of the ARFN node 106 may include a three-dimensional (3D), infrared (IR) camera and a red-green-blue (RGB) camera. The 3D, IR camera may be configured to capture information for detecting depths of objects within the environment 202, while the RGB camera may be configured to detect edges of objects by identifying changes in color within the environment 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector(s) 110 and/or the camera(s) 208. For example, in one implementation the actuator may comprise a pan motor 212, a tilt motor 214, and so forth. The pan motor 212 is configured to rotate the chassis 204 in a yawing motion. The tilt motor 214, meanwhile, is configured to change the pitch of the chassis 204. In some instances, the ARFN 106 additionally or alternatively includes a roll motor 216, which allows the chassis 204 to move in a rolling motion. By panning, tilting, and/or rolling the chassis 204, different views of the environment 202 may be acquired.

One or more microphones 218 may be disposed within the chassis 204, or elsewhere within the environment 202. The one or more microphones 218 may be used to acquire input from an entity (e.g., a user), for echolocation, location determination of a sound, or to otherwise aid in the characterization of and receipt of input from the environment 202. In some instances, a user may use voice commands to control various aspects of the ARFN node 106. A speaker(s) 220 may also be present to provide audible output, such as the output from a text-to-speech module or playback from pre-recorded audio.

A transducer 222 may be present within the ARFN node 106, or elsewhere within the environment 202, and may be configured to detect and/or generate inaudible signals, such as infrasound or ultrasound. These inaudible signals may be used to provide for signaling between accessory devices and the ARFN node 106.

The ARFN node 106 may also include a ranging system 224. The ranging system 224 is configured to provide distance information from the ARFN node 106 to a scanned entity, object (e.g., display medium), or set of objects. The ranging system 224 may comprise radar, light detection and ranging (LIDAR), ultrasonic ranging, stereoscopic ranging, and so forth. In some implementations the transducer 222, the microphones 218, the speaker(s) 220, or a combination thereof may be configured to use echolocation or echo-ranging to determine distance and spatial characteristics of an entity or object.

In this illustration, the computing device(s) 108 is shown within the chassis 204. However, in other implementations all or a portion of the computing device(s) 108 may be disposed in another location and coupled to the ARFN node 106. This coupling may occur via wire, fiber optic cable, wirelessly, or a combination thereof. Furthermore, additional resources external to the ARFN node 106 may be accessed, such as resources in another ARFN node 106 accessible via a local area network, cloud resources accessible via a wide area network connection, or a combination thereof.

Also shown in this illustration is a projector/camera linear offset designated "O". This is a linear distance between the projector(s) 110 and the camera(s) 208. Placement of the projector(s) 110 and the camera(s) 208 at distance "O" from one another may aid in the recovery of structured or other light data from the environment. The known projector/camera linear offset "O" may also be used to calculate distances, dimensioning, and otherwise aid in the characterization of entities or objects within the environment 202. In other implementations the relative angle and size of the projector field of view 206 and camera field of view 210 may vary. Also, the angle of the projector(s) 110 and the camera(s) 208 relative to the chassis 204 may vary.

In other implementations, the components of the ARFN node 106 may be distributed in one or more locations within the environment 100. As mentioned above, the microphones 218 and the speaker(s) 220 may be distributed throughout the environment. The projector(s) 110 and the camera(s) 208 may also be located in separate chasses 204. The ARFN node 106 may also include discrete portable signaling devices used by entities to issue command attention inputs. For example, these may be acoustic clickers (audible or ultrasonic), electronic signaling devices such as infrared emitters, radio transmitters, and so forth.

The ARFN node 106 is shown in FIG. 2 with various sensors, but other sensors may be located either within or external to the chassis 204. The sensors may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, pressure sensors, and so forth.

Example Process

Figure 3:
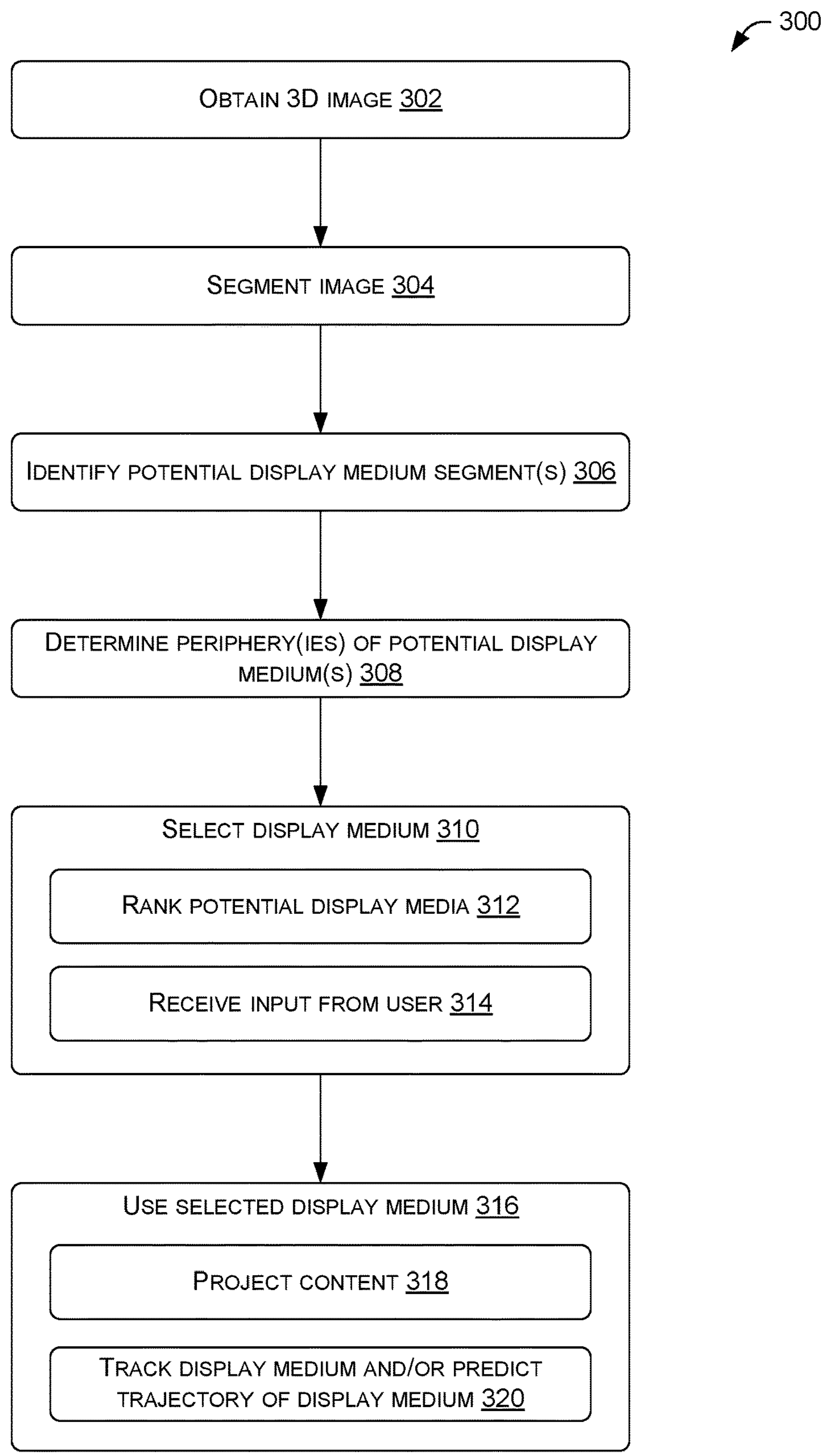
FIG. 3 is an example flow diagram of an ARFN locating a display medium on which content is projected.

FIG. 3 illustrates an example process 300 of locating and using a periphery of a passive, reflective, or translucent medium, such as the display medium 104. The process 300 is described in reference to the environment 100 of FIG. 1, however various aspects of the process 300 may be utilized in different environments, using different types of components.

At 302, the ARFN 106 may obtain a 3D image of the environment 100. The 3D image may comprise a depth map or 3D point cloud obtained, calculated, or reconstructed by the ARFN 106 in conjunction with the projector(s) 110 and the sensor(s) 112 (e.g., camera, ranging system, etc.). For example, the ARFN 106 may utilize structured light analysis to determine the distance of surface points viewed by a camera. Specifically, the projector(s) 110 may project a structured light pattern onto the scene within the environment 100, and the camera may capture an image of the reflected light pattern. Deformation in the reflected pattern, due to a lateral displacement between the projector(s) 110 and the camera, may be analyzed by the ARFN 106 to determine depths or distances corresponding to different points, areas, or pixels within the environment 100. Other types of systems may alternatively be utilized to obtain a 3D image of the environment, such as techniques involving time-of-flight observations. Although a 3D image or point set is described in the example of FIG. 3, any type of image or point set may be used (e.g., 2D point set).

At 304, the ARFN 106 may segment the 3D image to generate multiple 3D point sets corresponding to different surfaces within the 3D image. Segmenting may be performed using surface normals that represent the orientation of local surfaces in a 3D point set (K. Klasing, D. Althoff, D. Wollherr, and M. Buss: Comparison of Surface Normal Estimation Methods for Range Sensing Applications, Proc of IEEE ICRA 09). Initial segmentation may be performed in the surface normal domain. Surfaces containing smoothly varying surface normals may be clustered by various techniques. For example, an algorithm known as the watershed transformation may be used for initial segmentation (Olsen, O. and Nielsen, M.: Multi-Scale Gradient Magnitude Watershed Segmentation, Proc. of ICIAP 97). Further processing, including merging and splitting identified segments, may be performed in different embodiments. For planar surface segmentation, a segment resulting from surface normal clustering may be processed by a plane estimation routine such as random sample consensus (RANSAC) plane estimation. Surfaces with similar plane equations may be merged into one segment, or split vice versa.

At 306, the ARFN 106 may analyze and/or compare the identified segments and their respectively corresponding 3D point sets to identify one or more of the segments that are likely to represent one or more potential display media. This may be performed in accordance with various object recognition techniques. In some embodiments, methods of relatively low complexity may be used to initially evaluate the likelihood that a particular segment contains a display medium. For example, assuming that the display medium is white, the operation 306 may identify segments that are predominately white. Other properties or characteristics of the potential display medium may similarly be used. For example, the operation 306 may perform a rough search based on the general shape, size, or aspect ratio of the potential display medium, without attempting to conclusively determine whether any given segment contains the potential display medium. Alternatively, or additionally, the operation 306 may identify segments that are located within a predetermined proximity to a user, which may provide some indication that the segment is used for consuming content. Furthermore, this analysis may be performed on relatively sparse data, in order to further reduce the complexity of processing.

At 308, the ARFN 106 may determine a periphery of a potential display medium by examining the 3D point set of a segment identified in the operation 306. For example, the ARFN 106 may determine a shape, size, and/or 3D pose of a periphery of the potential display medium. The operation 308 will be described in further detail below with reference to FIGS. 4 and 5. In instances where a plurality of potential display medium segments are identified in the operation 306, the operations described in FIGS. 4 and 5 may be performed for each of the plurality of potential display medium segments resulting in a determined periphery for each of the plurality of potential display medium segments.

At 310, the ARFN 106 may select a display medium from one or more potential display media to use at an operation 316. In some instances, the environment 100 may include a plurality of potential display media onto which content may be projected, such as different surfaces within the environment 100. Thus, at 310 the ARFN 106 may select a particular display medium of the plurality of potential display media that satisfies one or more criteria. For example, as discussed below, the ARFN 106 may select a potential display medium that ranks the highest among the plurality of display media and/or a potential display medium that is chosen by a user.

At 312, the ARFN 106 may rank the plurality of potential display media with respect to each other. In one example, a periphery of each of the plurality of potential display media is compared to peripheries of display media that have been previously used and each potential display medium is ranked based on the comparison. The previously used display media may be associated with a particular individual that is currently using the ARFN 106. Alternatively, or additionally, a potential display medium that is located relatively close to a user may rank higher than another display medium. Further, a potential display medium that has a particular shape, size, and/or three-dimensional (3D) pose may rank higher than another display medium that does not have the particular shape, size, and/or 3D pose. For instance, a potential display medium that has a rectangular shape may rank higher than a potential display medium that has a hexagonal shape. In some instances, a potential display medium that ranks the highest may be automatically selected.

At 314, the ARFN 106 may receive input from a user including a selection of a potential display medium. In some instances, the potential display media may be provided in a ranked list to the user for selection, while in other instances the potential display media may be provided in an unordered list. In either case, the list may include information about the potential display media, such as a shape or location.

At 316, the ARFN 106 may use the display medium selected in the operation 310 and the corresponding periphery of the display medium determined at the operation 308. For example, at 318 the ARFN 106 may use the determined periphery of a selected display medium to project content onto the display medium. As such, the projector 110 may aim, scale, rotate, or otherwise adjust the content to be occupied onto a surface within the periphery of the display medium. Additionally, or alternatively, at 320, the ARFN 106 may use the determined periphery to track the selected display medium and/or predict a trajectory of the selected display medium. In some instances, other operations are alternatively or additionally performed at the operation 316. In one embodiment, the operation 316 includes performing techniques described in "Edge-Based Pose Detection," U.S. application Ser. No. 13/486,634, filed on Jun. 1, 2012, the entire contents of which is incorporated herein by reference.

Periphery Detection

Figure 4:
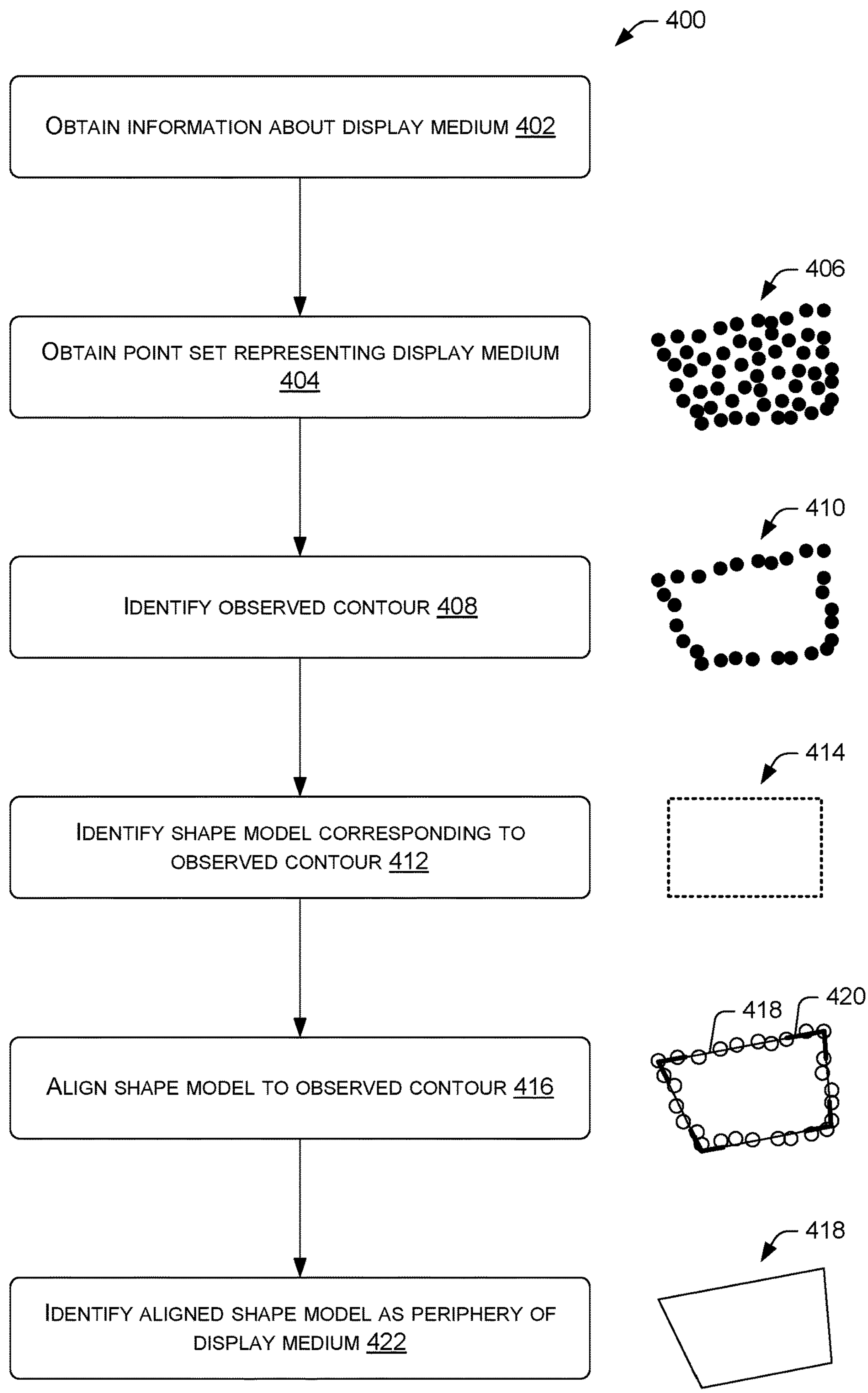
FIG. 4 is an example flow diagram of an ARFN determining a periphery of a display medium on which content is projected.

FIG. 4 illustrates an example process 400 of determining a periphery of a passive, reflective, or translucent medium, such as the display medium 104. The process 400 is described in reference to the environment 100 of FIG. 1, however various aspects of the process 400 may be utilized in different environments, using different types of components. In some instances, the process 400 is performed at the operation 308 of FIG. 3. As noted above, when the environment 100 includes multiple potential display media, the process 400 may be performed for each of the potential display media.

At 402, the ARFN 106 may, in some instances, obtain information about the display medium 104. For example, the ARFN 106 may receive input from a user regarding the type, shape, and/or size (e.g., dimensions) of the display medium 104. This input may be requested of a user or otherwise provided by the user upon, for example, powering on the ARFN 106 or initiating consumption of content. Alternatively, or additionally, the ARFN 106 may obtain information about the display medium 104 from a data store (e.g., the shape model data store 132 of FIG. 1) identifying a display medium that was previously used by a particular user. Here, the ARFN 106 may utilize facial recognition, voice recognition, or another technique for identifying/authenticating a user so that the ARFN 106 may determine the particular user interacting with the ARFN 106. Although illustrated as being included in the process 400 in FIG. 4, in some instances the operation 402 may not be performed when information is not available.

At 404, the ARFN 106 may obtain a point set 406 representing the display medium 104. The point set 406 may correspond to the 3D point set identified at the operation 306 of FIG. 3 as representing the display medium 104.

At 408, the ARFN 106 may identify a contour or boundary 410 of the 3D point set 406, referred to herein as the data contour or observed contour. The observed contour 410 includes the 3D points lying on the outermost edges or periphery of the 3D point set 406. To calculate or construct the observed contour 410, an intensity threshold may be applied to the points of the 3D point set 406 to create a binary image, which may in turn be smoothed or otherwise filtered. Boundary or edge points may be identified using various available techniques, such as techniques described in H. Edelsbrunner, D Kirkpatrick, and R. Seidel: On the Shape of a Set of Points in the Plane, IEEE Transactions on Information Theory, July, 1983. Although the process 400 is illustrated in FIG. 4 as including the operation 408, in some instances the operation 408 may be omitted and the point set 406 may be used at, for example, operations 412, 416, and/or 422.

At 412, the ARFN 106 may identify a shape model 414 that corresponds to the observed contour 410. By doing so, a general shape of the observed contour 410, and the corresponding display medium 104, may be detected. The operation 412 will be described in further detail below in reference to FIG. 5.

At 416, the ARFN 106 may align the shape model 414 identified at the operation 412 to the observed contour 410 identified at the operation 408. To align the shape model 414, edges or contours of the shape model 414 may be adjusted to fit the general shape, dimensions (e.g., size), and/or pose of the observed contour 410. For example, a side of the shape model 414 may be adjusted so that the side is approximately equal in length to an estimated side of the observed contour 410, a side of the shape model 414 may be aligned with a pose (e.g., position and orientation) of a side of the observed contour 410, and so on.

In one embodiment, one or more segments (e.g., sides) of the shape model 414 may be aligned individually to the observed contour 410. That is, the shape model 414 may be separated to form one or more individual line segments. A line segment may correspond to a straight or curved side of the shape model 414 (e.g., in FIG. 4 the shape model 414 includes four segments). In this embodiment, each segment may be individually aligned in the 3D space to a corresponding segment of the observed contour 410, and corners may be defined by intersections of segments. If, for example, two segments do not exactly intersect (e.g., segments were not map to a same plane in the 3D space), interpolation operations may be performed to estimate the intersection.

Further in another embodiment, a plurality of segments of the shape model 414 may be aligned to the observed contour 410 as a group. Here, each segment may be represented by an equation, and the equations of each of the segments may be solved as a group such that corners or connections are defined between two adjacent segments. In some instances, constraints may be applied to the segments when solving the equations, such as constraints based on a known or assumed size or pose of a segment, a known or assumed plane in which the segments lay, and so on.

Moreover, in some cases the shape model 414 may be aligned to the observed contour 410 based on techniques described in "Edge-Based Pose Detection," U.S. application Ser. No. 13/486,634, filed on Jun. 1, 2012. Other techniques may additionally or alternatively be used to align the shape model 414 to the observed contour 410. As illustrated in FIG. 4, an aligned shape model 418 and/or corners of the aligned shape model 420 may result from performing the operation 416.

At 422, the ARFN 106 may identify the aligned shape model 418 (resulting from the operation 416) as the periphery of the display medium 104. In other words, the periphery of the display medium 104 may be estimated based on the aligned shape model 418. Information about the shape, size, and/or 3D pose of the aligned shape model 418 may be stored at, for example, the ARFN 106. In some instances, the information is stored is association to a particular user that is identified as using the display medium 104.

Shape Identification

Figure 5:
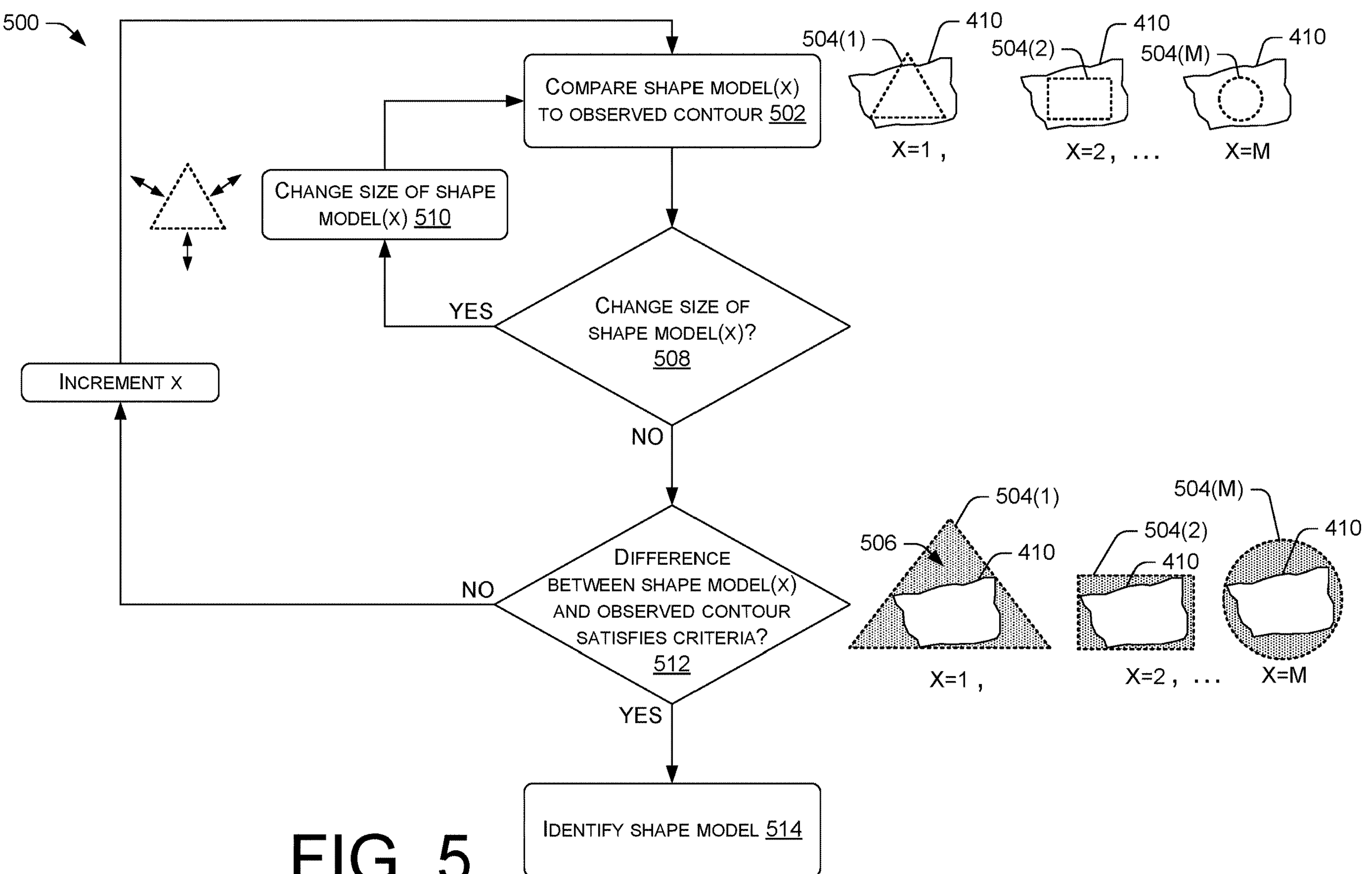
FIG. 5 is an example flow diagram of an ARFN identifying a shape model corresponding to an observed contour of a display medium.

FIG. 5 illustrates an example process 500 of identifying a shape model that corresponds to an observed contour. For instance, the process 500 may identify a shape model that most closely matches an observed contour (e.g., shape of the observed contour) from among a plurality of shape models. In some instances, the process 500 may be performed in situations where a shape of the display medium 104 is not known ahead of time. The process 500 is described in reference to the environment 100 of FIG. 1 and components illustrated in FIG. 4, however various aspects of the process 500 may be utilized in different environments, using different types of components. In some instances, the process 500 is performed at the operation 412 of FIG. 4. In FIG. 5, reference may be made to the observed contour 410 of FIG. 4. For ease of illustration, the observed contour 410 is illustrated in FIG. 5 with lines instead of points as illustrated in FIG. 4.

At 502, the ARFN 106 may compare shape model(x) 504 to the observed contour 410. The shape model(x) 504 may represent one of a plurality of shape models 504(1), . . . , (M), where x may initially be set to 1 and incremented up to a value M. In some cases, the plurality of shape models 504(1), . . . , (M) may correspond to the shape models 130 of the environment 100. The comparison at 502 may include centering the shape model(x) 504 with respect the observed contour 410 and determining a difference in area between the shape model(x) 504 and the observed contour 410 (e.g., the area encompassed within the observed contour 410). This difference is illustrated in FIG. 5 by a stippling area 506.

At 508, the ARFN 106 may determine whether or not to change (e.g., increase or decrease) a size of the shape model(x) 504. For instance, if the difference 506 between the shape model(x) 504 and the observed contour 410 is greater than or less than a predetermined value (e.g., greater than 40% of an area encompassed by the observed contour 410), then the ARFN 106 may wish to increase the size of the shape model(x) 504 so that a more useful comparison may be made. Alternatively, or additionally, if a predetermined number of sides or corners of the shape model(x) 504 do not contact sides or corners of the observed contour 410, then the ARFN 106 may wish to increase the size of the shape model(x) 504.

If, at 508, the ARFN 106 determines to change the size of the shape model(x) 504, then at 510 the shape model(x) 504 may change in size by a particular amount. The shape model(x) 504 may be changed by, for example, increasing/decreasing an area of the shape model(x) 504 by a predetermined percentage (e.g., increase/decrease area by 10%), lengthening/shortening one or more sides of the shape model(x) 504, and so on. In some instances, the operation 510 is performed multiple times by various amounts in order to incrementally refine a size of the shape model(x) 504. By changing a size of the shape model(x) 504, the ARFN 106 may use the shape model(x) 504 with a size that more closely matches a size of the observed contour 410. This may result in a more accurate detection of a shape of the observed contour 410.

Alternatively, if at 508 the ARFN 106 determines to not change the size of the shape model(x) 504, then at 512 the ARFN 106 may determine whether or not the difference 506 between the shape model(x) 504 and the observed contour 410 satisfies one or more criteria. For instance, if the difference 506 is less than a predetermined value (e.g., 15% of an area of the shape model(x) 504), then the ARFN 106 may determine that the one or more criteria are satisfied. Here, the predetermined value may be less than the predetermined value used in determining whether to increase the size of the shape model(x) 504 in the operation 508. Alternatively, or additionally, if the difference 506 is less than a difference in area between a different shape model (e.g., previously compared shape model) and the observed contour 410, then the ARFN 106 may determine that the one or more criteria are satisfied. By performing the operation 512, the ARFN 106 may identify a shape model of a plurality of shape models that most closely matches the observed contour 410.

Upon determining that the one or more criteria are satisfied at the operation 512, the ARFN 106 may, at 514, identify the shape model(x) 504 (e.g., current shape model) as corresponding to the observed contour 410.

Alternatively, upon determining that the one or more criteria are not satisfied at the operation 512, the ARFN 106 may increment x and return to the operation 502. The operations 502, 508, 510, and/or 512 may be performed with a next shape model of the plurality of shape models 504(1), . . . , (M).

In some embodiments, each time the shape model(x) 504 is changed (e.g., with each increment in x), a number of sides of the shape model(x) 504 is increased. For example, the operations 502, 508, and 512 may be performed a first time based on a triangle shape model (e.g., 3-sided shape), performed a second time based on a quadrilateral shape model (e.g., 4-sided shape), performed a third time based on a pentagon shape model (e.g., 5-sided shape), and so on. In one case, after a particular shape model is used, such as a shape model with a particularly large number of sides in comparison to other shape models in the data store 132, a circular or ellipse shape model may be used.

Further, in some embodiments the process 500 (e.g., operations 502, 508, 510, and/or 512) may be performed in parallel for different types of shape models. For example, the process 500 may be performed for a circle or ellipse shape model simultaneously as the process 500 is performed for polygon shape models. The lowest difference in each of the parallel channels may be compared to identify a shape model that most closely matches the observed contour 410. In addition, in some cases the process 500 is performed in real-time as content is projected onto the display medium 104.

Moreover, in some embodiments the process 500 (e.g., operations 502, 508, 510, and/or 512) may begin using shape models that are known to be associated with users. Thereafter, if necessary, the process 500 may transition to shape models that are not known to be associated with the users. To illustrate, the ARFN 106 may use information about the types of display mediums that have been previously used by users in the environment 100, such as a shape models that is associated with a user in the data store 132 of FIG. 1. This information may allow the ARFN 106 to perform the process 500 initially based on shape models that correspond to previously used display mediums, and then, if needed, proceed in the manner described above (e.g., increasing a number of sides of a shape model with each iteration, etc.).

The processes 300, 400, and 500 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:

one or more cameras;

one or more processors; and one or more non-transitory computer-readable storage media storing computer-executable instructions that, when executed by the one or more processors, cause the one or more processors to perform acts comprising:

determining a point set representing at least a portion of an environment based at least in part on one or more images captured by the one or more cameras;

determining multiple potential display surfaces based at least in part on the point set;

receiving, from a user device, input indicating a selection of a surface from the multiple potential display surfaces, the surface to be used in connection with displaying content;

identifying a shape of at least a portion of the surface to be used in connection with displaying the content, the shape corresponding to a boundary of the portion of the surface to be used in connection with displaying the content and comprising points of the point set;

aligning a shape model to the shape by:

determining two or more segments associated with the shape model, and determining at least one of a first size, a first position, or a first orientation of a segment of the two or more segments based at least in part on at least one of a second size, a second position, or a second orientation of a corresponding segment of the shape; and causing the content to be displayed with respect to the surface based at least in part on aligning the shape model to the shape.

2. The system of claim 1, wherein the acts further comprise:

identifying one or more shape models relative to the shape; and selecting the shape model from the one or more shape models that corresponds to the shape.

3. The system of claim 1, wherein the point set represents a position of the surface relative to the one or more cameras.

4. The system of claim 2, wherein the identifying the one or more shape models comprises:

analyzing the shape model with respect to the shape to determine a difference between the shape model and the shape;

determining that the difference between the shape model and the shape is less than a predetermined value; and identifying the shape model as corresponding to the shape at least partly in response to determining that the difference between the shape model and the shape is less than the predetermined value.

5. The system of claim 1, wherein the acts further comprise tracking, during one or more time periods, the point set of least a portion the surface relative to the one or more cameras.

6. A method comprising:

determining, based at least in part on one or more images that depict an environment, a point set;

determining, based at least in part on the point set, multiple potential display surfaces;

receiving, from a user device, input indicating a selection of a display surface to be used in connection with displaying content;

determining that points of the point set correspond to a shape of at least a portion of the display surface to be used in connection with displaying the content, the shape corresponding to a boundary of the portion of the display surface to be used in connection with displaying the content;

aligning a shape model to the shape by:

determining at least one of an adjusted size, an adjusted position, or an adjusted orientation of at least one individual segment of the shape model to align with a corresponding individual segment of the shape; and causing the content to be displayed with respect to the display surface based at least in part on aligning the shape model to the shape.

7. The method of claim 6, further comprising:

ranking, based at least in part on the point set, the one or more potential display surfaces; and sending a ranked list of the one or more potential display surfaces to the user device.

8. The method of claim 7, wherein ranking the one or more potential display surfaces is based at least in part on a position of the one or more potential display surfaces relative to one or more imaging sensors that captured the one or more images.

9. The method of claim 6, wherein the shape model comprises data associated with at least one of a triangle, quadrilateral, pentagon, hexagon, ellipse, or circle.

10. The method of claim 6, further comprising:

analyzing one or more shape models relative to the shape; and identifying the shape model from the one or more shape models that corresponds to the shape.

11. The method of claim 10, wherein identifying the shape model includes iteratively comparing a plurality of shape models to the shape until one or more criteria are satisfied.

12. The method of claim 6, further comprising determining at least one of a third shape, a size, a position, or an orientation of the shape based at least in part on the at least one of the adjusted size, the adjusted position, or the adjusted orientation of the at least one individual segment of the shape model.

13. The method of claim 6, wherein the shape is associated with depth information indicating a first distance from at least one imaging sensor to a first point associated with a first location on the shape and a second distance from the at least one imaging sensor to a second point associated with a second location on the shape.

14. A system comprising:

one or more processors; and one or more non-transitory computer-readable storage media storing computer-executable instructions that, when executed by the one or more processors, cause the one or more processors to perform acts comprising:

determining, based at least in part on one or more images that depict an environment, a point set;

determining, based at least in part on the point set, multiple potential display surfaces;

receiving, from a user device, input indicating a selection of a display surface from the multiple potential display surfaces, the display surface to be used in connection with displaying content;

determining a shape of at least a portion of the display surface to be used in connection with displaying the content, the shape comprising points of the point set that correspond to a boundary of the portion of the display surface to be used in connection with displaying the content;

aligning a shape model to the shape by:

determining at least one of an adjusted size, an adjusted position, or an adjusted orientation of at least one individual segment of the shape model to align with a corresponding individual segment of the shape; and causing the content to be displayed with respect to the display surface based at least in part on aligning the shape model to the shape.

15. The system of claim 14, wherein the acts further comprise determining at least one of a second shape, a size, a position, or an orientation of the shape based at least in part on the at least one of the adjusted size, the adjusted position, or the adjusted orientation of the at least one individual segment of the shape model.

16. The system of claim 14, wherein the acts further comprise:

ranking the one or more potential display surfaces including the display surface; and sending a ranked list of the one or more potential display surfaces to the user device.

17. The system of claim 14, wherein causing the content to be displayed with respect the display surface further comprises determining a variation in at least one of a size, a location, an orientation, or an aspect ratio of the content.

18. The system of claim 1, wherein determining the multiple potential display surfaces includes determining a periphery of each display surface of the multiple potential display surfaces.

19. The method of claim 6, wherein determining the multiple potential display surfaces includes determining a periphery of each display surface of the multiple potential display surfaces.

20. The system of claim 1, wherein individual segments of the two or more segments correspond to a straight side or a curved side of the shape model.

* * * * *